United States Patent
Balasubramanian et al.

(10) Patent No.: US 12,493,116 B2
(45) Date of Patent: Dec. 9, 2025

(54) VISUAL SENSING FOR POSITIONING

(71) Applicant: QUALCOMM Incorporated, San Diego, CA (US)

(72) Inventors: Anantharaman Balasubramanian, San Diego, CA (US); Kapil Gulati, Belle Mead, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 18/065,279

(22) Filed: Dec. 13, 2022

(65) Prior Publication Data

US 2024/0192357 A1      Jun. 13, 2024

(51) Int. Cl.
  *G01S 13/86* (2006.01)
  *G01S 5/02* (2010.01)

(52) U.S. Cl.
  CPC .......... *G01S 13/867* (2013.01); *G01S 5/0284* (2013.01)

(58) Field of Classification Search
  CPC .. G01S 13/867; G01S 5/0284; G01S 5/02585; G01S 5/0273; G01S 5/16
  See application file for complete search history.

(56) References Cited

U.S. PATENT DOCUMENTS

| | | | |
|---|---|---|---|
| 9,609,484 B1 * | 3/2017 | Rodoper | G01S 5/0295 |
| 2015/0339823 A1 * | 11/2015 | Siomina | G01S 5/16 |
| | | | 348/135 |
| 2018/0307238 A1 * | 10/2018 | Wisniowski | G01S 17/86 |
| 2019/0370567 A1 * | 12/2019 | Eckman | G06V 20/52 |
| 2020/0018814 A1 * | 1/2020 | Perez-Ramirez | G01S 5/02585 |
| 2020/0133288 A1 * | 4/2020 | Abari | G05D 1/0088 |
| 2021/0117659 A1 * | 4/2021 | Foroozan | G06V 10/25 |
| 2022/0078581 A1 * | 3/2022 | Choi | G01S 5/0269 |
| 2022/0394660 A1 * | 12/2022 | Werner | H04L 67/12 |
| 2022/0397686 A1 * | 12/2022 | Scacchi | G01S 19/485 |
| 2023/0254567 A1 * | 8/2023 | Kleinbeck | G06T 7/73 |
| | | | 455/67.11 |
| 2024/0089904 A1 * | 3/2024 | Balasubramanian | H04W 64/003 |

OTHER PUBLICATIONS

International Search Report and Written Opinion—PCT/US2023/078342—ISA/EPO—Feb. 22, 2024.

* cited by examiner

*Primary Examiner* — Nizar N Sivji
(74) *Attorney, Agent, or Firm* — QUALCOMM Incorporated

(57) ABSTRACT

This disclosure provides systems, methods, and devices for wireless communication that support visual sensing for positioning. In a first aspect, a method of wireless communication includes receiving a first image of an object from an image capture device. The method also includes receiving location information that includes a coordinate point, a position of the UE determined based on the coordinate point, or a combination thereof. The coordinate point is generated based on a relative orientation between the UE and a network entity, and a matched pair of points including a first point of the first image and a second point of a second image of the object captured by the network entity. Other aspects and features are also claimed and described.

26 Claims, 10 Drawing Sheets

VISUAL SENSING FOR POSITIONING

TECHNICAL FIELD

Aspects of the present disclosure relate generally to wireless communication systems, and more particularly, to visual sensing for positioning, such as non-line of sight positioning. Some features may enable and provide improved communications or positioning, including reduced control overhead, efficient resource utilization, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Multiple devices of a wireless communication system may operate to enable positioning operations to be performed between the multiple devices. The positioning operations may enable at least one device of the multiple devices to determine a direction toward another device, a distance from the other device, or an estimated location of the at least one device. Additionally, the positioning operations may also enable the at least one device to determine an absolute location of the at least one device or of another device. However, as devices continue to improve and "do more", networks and devices of the network may experience increased network congestion, overhead, and interferences associated with determining positioning information of devices within a network. For example, accuracy and the effectiveness of the positioning operations may be impacted by interferences such physical object that obstruct a line-of-sight between two devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes receiving a first image of an object from an image capture device. The method also includes receiving location information that includes a coordinate point, a position of the UE determined based on the coordinate point, or a combination thereof. The coordinate point is generated based on a relative orientation between the UE and a network entity, and a matched pair of points including a first point of the first image and a second point of a second image of the object captured by the network entity.

In an additional aspect of the disclosure, an apparatus includes at least one processor and a memory coupled to the at least one processor. The at least one processor is configured to receive a first image of an object from an image capture device. The at least one processor is further configured to receive location information that includes a coordinate point, a position of the UE determined based on the coordinate point, or a combination thereof. The coordinate point is generated based on a relative orientation between the UE and a network entity, and a matched pair of points including a first point of the first image and a second point of a second image of the object captured by the network entity.

In an additional aspect of the disclosure, an apparatus includes means for receiving a first image of an object from an image capture device. The apparatus further includes means for receiving location information that includes a coordinate point, a position of the UE determined based on the coordinate point, or a combination thereof. The coordinate point is generated based on a relative orientation between the UE and a network entity, and a matched pair of points including a first point of the first image and a second point of a second image of the object captured by the network entity.

In an additional aspect of the disclosure, a non-transitory computer-readable medium stores instructions that, when executed by a processor, cause the processor to perform operations. The operations include receiving a first image of an object from an image capture device. The operations further include receiving location information that includes a coordinate point, a position of the UE determined based on the coordinate point, or a combination thereof. The coordinate point is generated based on a relative orientation between the UE and a network entity, and a matched pair of points including a first point of the first image and a second point of a second image of the object captured by the network entity.

In one aspect of the disclosure, a method for wireless communication is performed by a network node. The method includes generating a coordinate point based on a relative orientation between a UE and a network entity, and a matched pair of image points including a first point of a first image of an object captured by the UE and a second point of a second image of the object captured by the network entity. The method further includes transmitting location information to the UE. The location information indicates the coordinate point, a position of the UE determined based on the coordinate point, or a combination thereof.

In an additional aspect of the disclosure, an apparatus includes at least one processor and a memory coupled to the at least one processor. The at least one processor is configured to generate a coordinate point based on a relative orientation between a UE and a network entity, and a matched pair of image points including a first point of a first image of an object captured by the UE and a second point of a second image of the object captured by the network entity. The at least one processor is further configured to transmit location information to the UE. The location information indicates the coordinate point, a position of the UE determined based on the coordinate point, or a combination thereof.

In an additional aspect of the disclosure, an apparatus includes means for generating a coordinate point based on a relative orientation between a UE and a network entity, and a matched pair of image points including a first point of a first image of an object captured by the UE and a second point of a second image of the object captured by the network entity. The apparatus further includes means for transmitting location information to the UE. The location information indicates the coordinate point, a position of the UE determined based on the coordinate point, or a combination thereof.

In an additional aspect of the disclosure, a non-transitory computer-readable medium stores instructions that, when executed by a processor, cause the processor to perform operations. The operations include generating a coordinate point based on a relative orientation between a UE and a network entity, and a matched pair of image points including a first point of a first image of an object captured by the UE and a second point of a second image of the object captured by the network entity. The operations further include transmitting location information to the UE. The location information indicates the coordinate point, a position of the UE determined based on the coordinate point, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
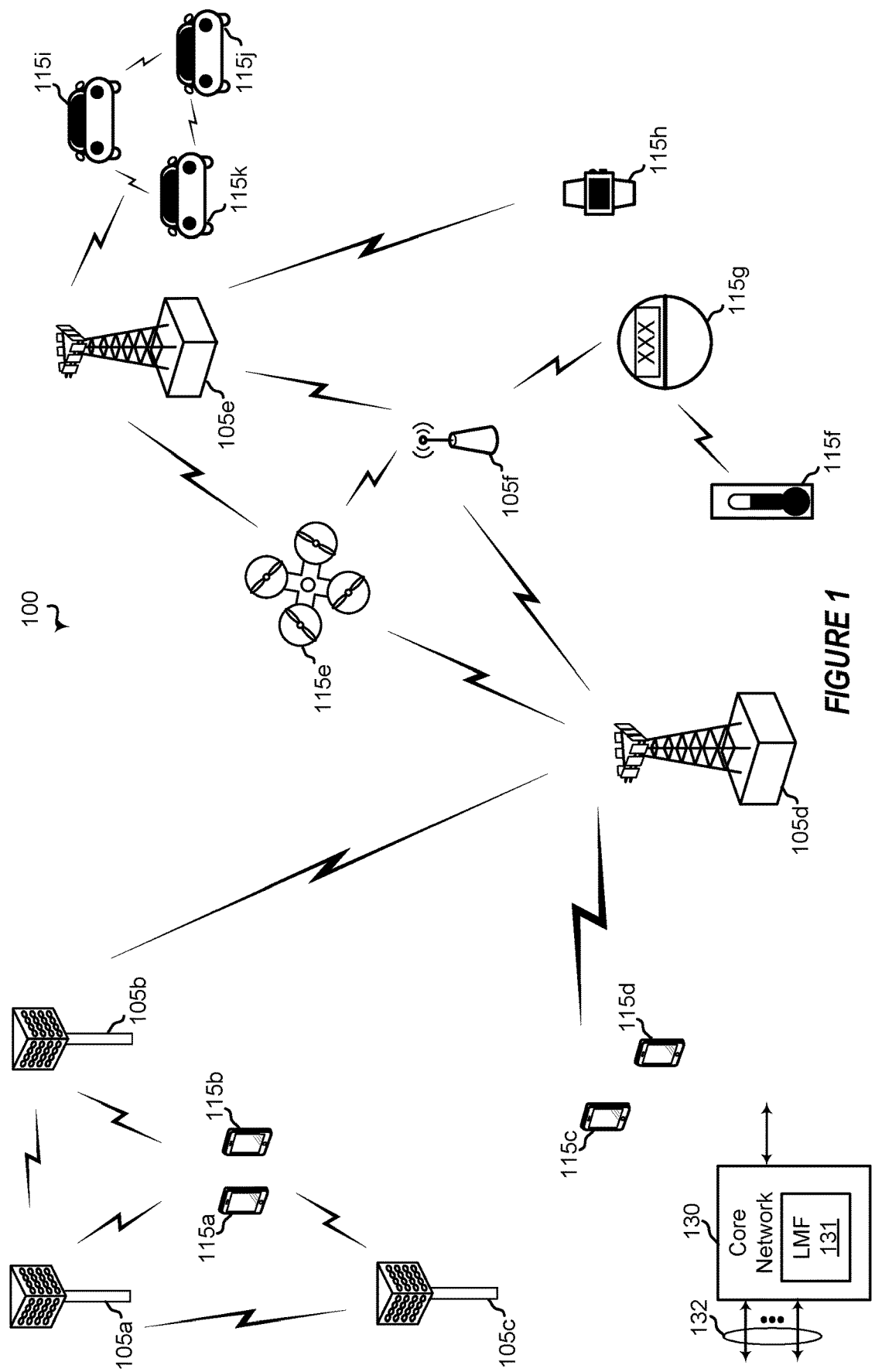
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support visual sensing for positioning. For example, the present disclosure describes visual features acquired associated with two devices to determine a position of at least one of the devices. For example, the two devices may include a user equipment (UE) and a base station that do not have a line-of-sight between the UE and the base station. The UE and the base station may each include cameras and may exchange visual features of each device to identify one or more pairs of points of a first image (of an object) captured by the UE and a second image (of the object) captured by the base station. A relative orientation between the UE and the base station may be determined based on the one or more pairs of points. A coordinate point, such as a virtual access three dimensional (3D) point, may be determined that is common to both the UE and the base station may be determined based on the relative orientation, one or more visual features of the UE, one or more visual features of the base station, or a combination thereof. To illustrate, the coordinate point may correspond to a reflection point, such as a reflection point of an object that in a field of view of each of the UE and the base station. In some implementations, the coordinate point is determined by a network entity, such as the base station, a core network, or a location management function (LMF) and is provided to the UE to enable the UE to localize itself—e.g., perform localization—based on the coordinate point. For example, the UE may use the coordinate point as a virtual anchor. In other implementations, the coordinate point is determined by the network entity and the network entity and the network entity, such as the base station or the LMF, performs localization of the UE based on the coordinate point. To perform the localization of the UE at the network entity, the network entity may receive, from the UE, a channel impulse response (e.g., time delay, AoA of multiple receive paths, etc.) based on a positioning reference signal. In additional to the above implementations, the base station or the UE may adjust one or more beams, such as angle-of-arrival (AoA) or an angle-of-departure (AoD) based on the coordinate point.

Particular implementations of the subject matter described in this disclosure may be implemented to realize one or more of the following potential advantages or benefits. In some aspects, the present disclosure provides techniques for supporting visual sensing for positioning. The techniques described may enable a position of the UE to be determined when a line-of-sight is not present between the UE and the base station. Additionally, the techniques may enable the base station or the UE to adjust one or more beams to improve transmission or reception of a reflected signal and therefore compensate for interference or an obstruction. Additionally, by using an image capture device of the UE to determine the coordinate point (e.g., a virtual access point), the UE may be able to determine a position of the UE based on only one base station (e.g., a real access point).

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (CNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IOT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a location management function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
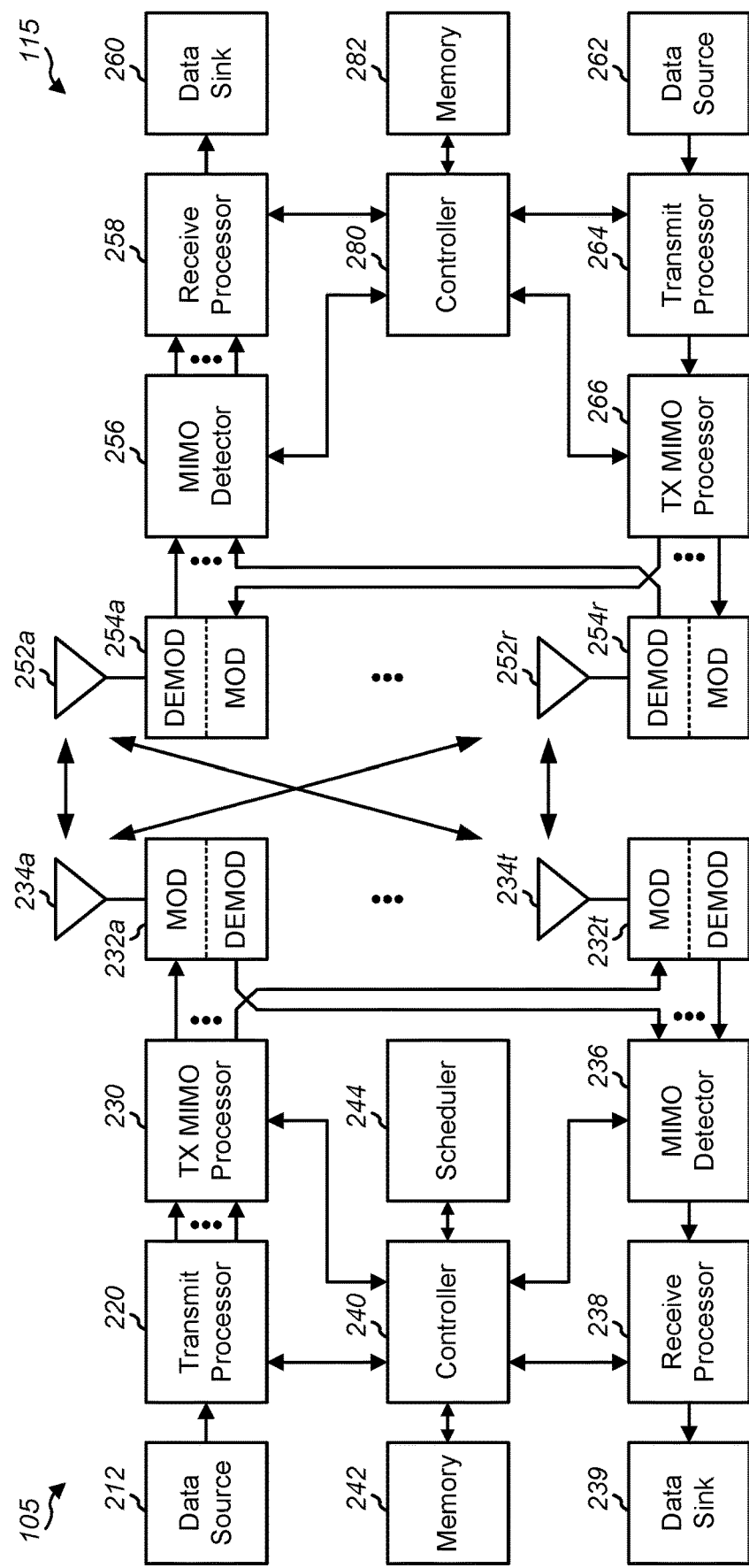
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 9 and 11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
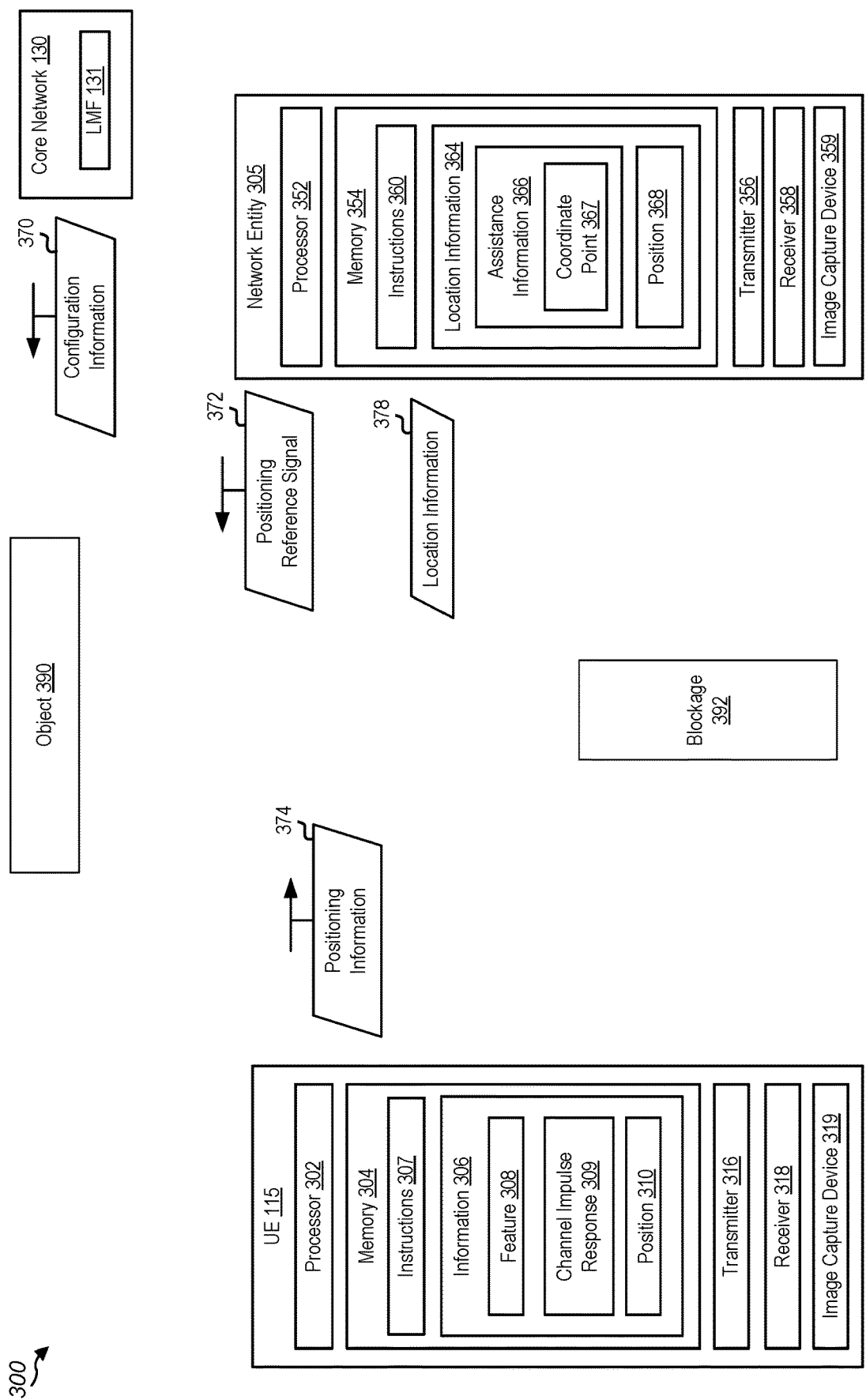
FIG. 3 is a block diagram illustrating an example wireless communication system that supports visual sensing for positioning according to one or more aspects.

FIG. 3 is a block diagram of an example wireless communications system 300 that supports visual sensing for positioning according to one or more aspects. In some examples, wireless communications system 300 may implement aspects of wireless network 100. Wireless communications system 300 includes UE 115, network entity 305, core network 130, an object 390, and a blockage. Although one UE 115 and one network entity 305 are illustrated, in some other implementations, wireless communications system 300 may generally include multiple UEs 115, multiple network entities 305, or a combination thereof. In some implementations, UE 115, base station 105, core network 130, LMF 131, or a roadside unit may alternatively be referred to as a network node. Additionally, or alternatively, in some implementations, UE 115 includes or is positioned in a vehicle.

In some implementations, object 390 and blockage 392 may include one or more structures. Each of object 390 and blockage 392 may be configured to reflect one or more signals, block or interfere with line of sight communication between two devices, or a combination thereof. As described herein with reference to FIG. 3, object 390 is generally described as reflecting one or more signals and blockage 392 is generally described as blocking or interfering with line of sight communication between two devices.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and one or more image capture devices 319 (hereinafter referred to collectively as "image capture device 319"). In some implementations, UE 115 may include an interface (e.g., a communication interface) that includes transmitter 316, receiver 318, or a combination thereof. Processor 302 may be configured to execute instructions 307 stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store instructions 307 and information 306. Information may be configured to store configuration information, a feature 308, a channel impulse response 309, and a position 310 (e.g., position information). In some implementations, memory 304 is also configured to store configuration information received by UE 115 from core network 130, LMF 131, or network entity 305. Feature 308 may include a key point, a feature, a feature descriptor, or a combination thereof. Channel impulse response 309 may be generated by UE 115 based on monitoring and/or receiving a positioning reference signal, such as positioning reference signal 372 from network entity 305. Position 310 may include or indicate a position, such as a position of UE 115, network entity, object 390, or blockage 392, as illustrative, non-limiting examples. Position 310 may be a coordinate, such as a 2D coordinate or a 3D coordinate, may be an absolute or relative position, or may indicate a direction. In some implementations, UE 115 is configured to perform localization to determine position 310 of UE 115. Additionally, or alternatively, memory 304 may be configured to store other data, such as map data.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

In some implementations, UE 115 may include one or more antenna arrays. The one or more antenna arrays may be coupled to transmitter 316, receiver 318, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Image capture device 319 is configured to capture an image, such as a first image of object 390. Additionally, or alternatively, image capture device 319 is configured to generate image data of the image, such as one or more pixel values.

UE 115 may include one or more components as described herein with reference to UE 115. In some implementations, UE 115 is a 5G-capable UE, a 6G-capable UE, or a combination thereof.

Network entity 305 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), one or more receivers 358 (hereinafter referred to collectively as "receiver 358"), and one or more image capture devices 319 (hereinafter referred to collectively as "image capture device 319"). In some implementations, base station 105 may include an interface (e.g., a communication interface) that includes transmitter 356, receiver 358, or a combination thereof. Processor 352 may be configured to execute instructions 360 stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store instructions 360 and location information 364. Location information may include assistance information 366 and a position 368. Assistance information may include or indicate a coordinate point 367. In some implementations, coordinate point 367 may include a virtual access point, such as a virtual access 2D point or a virtual access 3D point. Additionally, or alternatively, coordinate point 367 may include or correspond to a reflection point, such as a reflection point of one or more wireless signals. In some implementations, coordinate point 367 is associated with a point (e.g., a location) of object 390. Position 368 may include or indicate a position of network entity 305, a position of UE 115, or a combination thereof. Additionally, or alternatively, position 368 may include or indicate a direction (e.g., of travel) of UE 115, a relative orientation or translation between UE 115 and network entity 305, an absolute orientation of network entity 305, or a combination thereof.

Position 368 may include or correspond to position 310. For example, position 368 may be a position of UE 115. Additionally, or alternatively, position 368 may include or indicate a position, such as a position of UE 115, network entity, object 390, or blockage 392, as illustrative, non-limiting examples. Position 368 may be a coordinate, such as a 2D coordinate or a 3D coordinate, may be an absolute or relative position, or may indicate a direction. In some implementations, network entity 305 is configured to perform localization to determine position 310 of UE 115. Additionally, or alternatively, memory 354 may be configured to store other data, such as map data.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, base station 105 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Image capture device 359 is configured to capture an image, such as a second image of object 390. Additionally, or alternatively, image capture device 359 is configured to generate image data of the image, such as one or more pixel values.

Core network 130 may include a 4G core network, a 5G core, an evolved packet core (EPC). Core network 130 may be coupled, such as communicatively coupled, to base station 105, UE 115, network entity 305, or a combination thereof. Core network 130 may include or correspond to LMF 131. Although shown and described as being included in core network 130, LMF 131 may be distinct from core network 130 in some implementations. For example the LMF 131 may include one or more servers, such as multiple distributed servers. LMF 131 may be configured to support various functionality, such as managing support for different location services for one or more UEs or one or more network entities. For example, LMF 131 is configured to control the positioning parameters for UEs 115 and LMF 131 can provide information to network entity 305 and UE 115 so that action can be taken at UE 115. Network entities 305, such as base stations 105, may forward location messages to the LMF 131 and may communicate with the LMF 131 via a NR Positioning Protocol A (NRPPa). In some implementations, UE 115 and base station 105 are configured to communicate with the LMF 131 via an Access and Mobility Management Function (AMF).

In some implementations, LMF 131 is configured to support visual sensing for positioning. For example, LMF 131 may be configured to determine or generate configuration information (e.g., 370) for UE 115, network entity 305, or a combination thereof, that is associated with visual sensing for position, such as use of an image capture device to determine a position of UE 115, network entity 305, object 390, or blockage 392. The configuration information 370 may include or indicate a key point detection technique, a feature descriptor for one or more of the key points, a number of key point and associated features to be provided, an image type (e.g., a raw image or a compressed image), a key point sampling type, a direction of a field of view, one or more parameters of an image capture device, or a combination thereof. The key point detection technique may include a Harris corner detector, features from accelerated segment test (FAST), scale-invariant feature transform (SIFT), oriented FAST and rotated binary robust independent elementary features (BRIEF) (ORB), or a combination thereof, as illustrative, non-limiting examples. The feature descriptor for the one or more of the key points may include ORB, speeded up robust features (SURF), BRIEF, or a combination thereof, as illustrative, non-limiting examples. In some implementations, he number of key points N, where N is a positive integer, to be provided may be based on an intensity metric for each key point specified as the sharpness of a corner as in Harris corner measure. For example, key points corresponding to the first N highest corners are requested. In some implementations, the key point sampling type may indicate a uniform sampling in an image space or a non-uniform sampling in the image space, or a random sampling in the image space. The one or more parameters of the image capture device may include or indicate a focal length, an imaging size, a sampling characteristics (in the case of digital source images), a principal point, a lens distortion, or a combination thereof, as illustrative, non-limiting examples.

In some implementations, LMF 131 may be configured to perform one or more operations described herein with reference to network entity 305. Additionally, or alternatively, network entity 305 may be configured to perform one or more operations described herein with reference to LMF 131. Although shown and described as being separate, in some implementations, network entity 305 and LMF 131 may be included in the same device, such as a single server or a distributed server system.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP. In some other implementations, wireless communications system 300 implements a 6G network.

During operation of wireless communications system 300, core network 130 (e.g., LMF 131) may generate configuration information 370. Configuration information 370 may be associated with one or more visual features. Additionally, or alternatively, configuration information 370 may indicate a key point detection technique, a feature descriptor of one or more key points, a number of the one or more key points, a location or direction of the one or more key points, a parameter for an image capture device, or a combination thereof.

In some implementations, configuration information 370 may be generated based on one or more UE capabilities received from UE 115, one or more network entity capabilities received from network entity 305, or a combination thereof. For example, core network 130 (e.g., LMF 131) may receive and store the one or more UE capabilities of UE 115, the one or more network entity capabilities of network entity 305, or a combination thereof. Core network 130 (e.g., LMF 131) may transmit configuration information 370 to UE 115, network entity 305, or a combination thereof.

UE 115 may receive and store configuration information at memory 304. Based on configuration information 370, UE 115 may capture a first image using image capture device 319. For example, UE 115 may generate first image data based on the first captured image. In some implementations, the first image may include object 390.

UE 115 may process the first image (e.g., the first image data) to generate one or more key points, such as a first key point. Key points are pixels, such as corner points, in an image that can be easily tracked from image frame to image frame. Key points may have associated descriptors that help with the tracking process. A key point plus its descriptor is called a feature. Techniques for finding a key point includes Harris corner points, features from accelerated segment test (FAST), scale-invariant feature transform (SIFT), and oriented FAST and rotated binary robust independent elementary features (BRIEF) (ORB), as illustrative, non-limiting examples.

UE 115 may generate positioning information 374 based on one or more key points, one or more descriptors, one or more features, or a combination thereof. UE 115 may transmit positioning information 374 that includes or indicates the one or more key points, the one or more descriptors, the one or more features, or a combination thereof. For example, UE 115 may transmit positioning information 374 to network entity 305, core network 130, LMF 131, or a combination thereof.

In some implementations, UE 115 may receive a position signal, such as positioning reference signal 372, from network entity 305. For example, UE 115 and network entity 305 may perform downlink positioning, uplink positioning, or sidelink positioning. In some implementations, positioning performed between UE 115 and network entity 305 may occur when UE 115 and network entity 305 are not in line of sigh of each other, such as when blockage 392 is physically positioned between UE 115 and network entity 305.

It is noted that UE 115 may receive positioning reference signal 372 as a reflected signal such that positioning reference signal 372 transmitted by network entity 305 is reflected off of object 390 prior to being received by UE 115. UE 115 may monitor for positioning reference signal 372 and may generate a channel impulse response 309 based on positioning reference signal 372. UE 115 may transmit channel impulse response 309, or an indication thereof, to network entity 305, core network 130, LMF 131, or a combination thereof. In some implementations, positioning information 374 may include or indicate channel impulse response 309.

Network entity 305 may receive and store configuration information at memory 354. Based on configuration information 370, network entity 305 may capture a second image using image capture device 359. For example, network entity 305 may generate second image data based on the second captured image. In some implementations, the second image may include object 390.

Network entity 305 may process the first image (e.g., the first image data) to generate one or more key points, such as a second key point. Network entity 305 may generate positioning information based on one or more key points, one or more descriptors, one or more features, or a combination thereof, that are generated based on the second image. Network entity 305 may transmit positioning information that includes or indicates the one or more key points, the one or more descriptors, the one or more features, or a combination thereof, that are generated based on the second image. For example, network entity 305 may transmit the positioning information to core network 130, LMF 131, or a combination thereof. In some implementations, the positioning information transmitted by network entity 305 may include or indicate positioning information 374 received by network entity 305 from UE 115.

In some implementations, network entity 305 may determine one or more matching points between the first image and the second image. For example, network entity 305 may determine the one or more matching points based on one or more key points based on the first image and one or more key points based on the second image. Network entity 305 may determine a relative orientation (e.g., relative pose) based on the one or more matching points. For example, network entity 305 may determine the relative pose based on multiple matching points. To illustrate, network entity 305 may determine the relative pose using a technique such as forming and factoring an essential matrix (e.g., using 8 key points), Nister's method (e.g., using 5 key points), perspective-n-point (PNP) method (e.g., using 3 key points) if key point depth is being tracked, or a combination thereof.

Network entity 305 may determine an absolute orientation of UE 115 based on an orientation of network entity 305 and the relative pose. Additionally, or alternatively, network entity 305 may determine a translation t (to a scale) between UE 115 and network entity 305. For example, the translation t between UE 115 and network entity 305 may be known or determined based on ranging measurements.

Network entity 305 may determine coordinate point 367 based on the relative pose and the translation between UE 115 and network entity 305. To illustrate, coordinate point 367, such as a virtual access 3D point, may be determined that is common to both UE 115 and network entity 305 may be determined based on the relative orientation, one or more visual features of UE 115, one or more visual features of network entity 305, or a combination thereof. Coordinate point 367 may correspond to a reflection point, such as a reflection point of object 390 that in a field of view of each of UE 115 and network entity 305.

Figure 4:
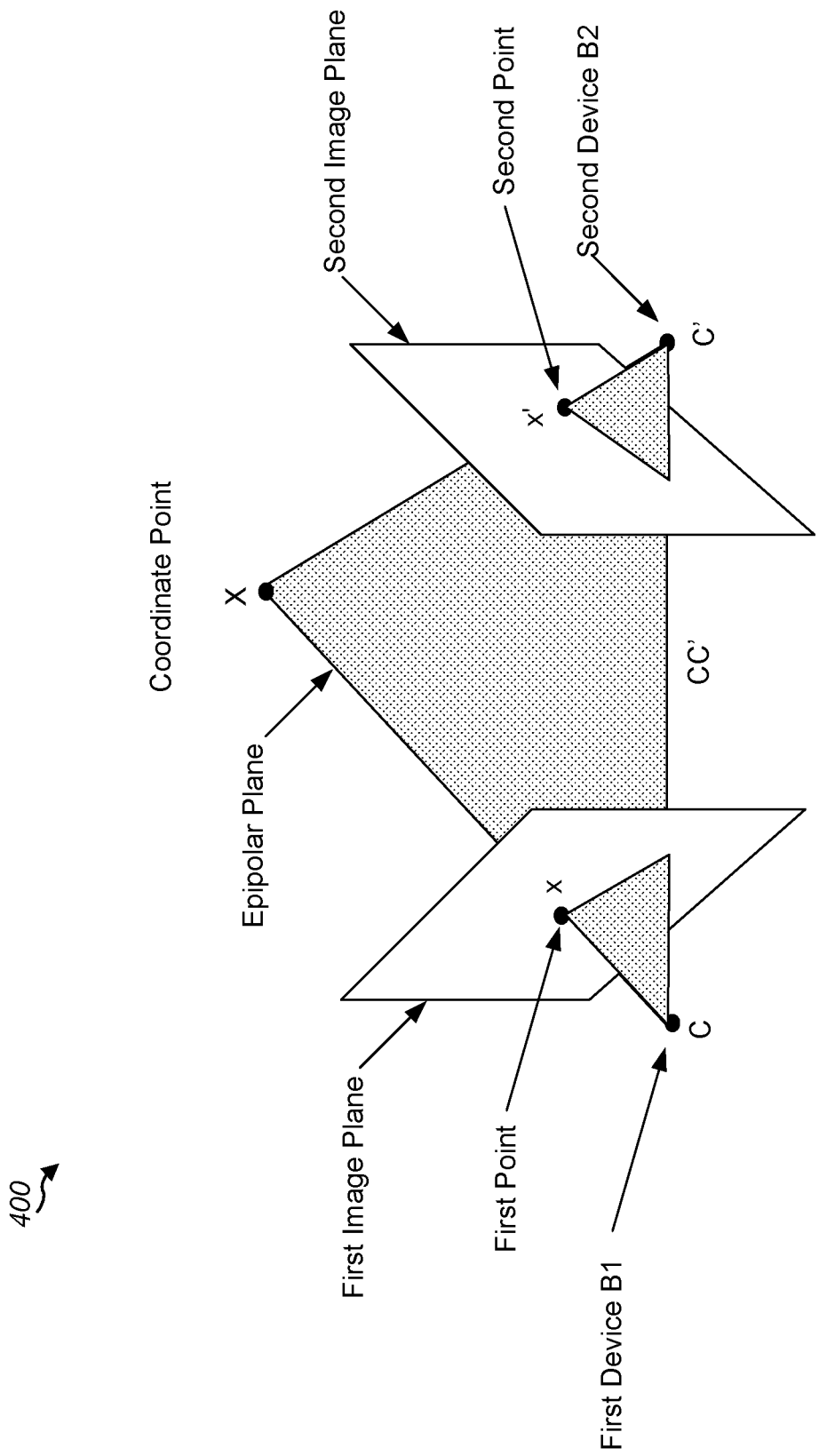
FIG. 4 is an example of a system that supports visual sensing for positioning according to one or more aspects.

Referring to FIG. 4, is an example of a system 400 that supports visual sensing for positioning according to one or more aspects. System 400 illustrates a determination of coordinate point 367 (referred to as coordinate point X in FIG. 4) with respect to two devices, such as a first device B1 and a second device B2. Coordinate point X may include or correspond to a point or location of object 390. First device B1 may include or correspond to UE 115 and second device B2 may include or correspond to network entity 305. As shown in FIG. 4, points C and C' are the optical axis of a first camera (e.g., 319) of first object B1 and a second camera (e.g., 359) of second device B2, respectively. Additionally, line CC' represents a distance between points C and C'.

First device B1 and second device B2 are configured to sense the environment around them. For example, an image sensed by first device B1 includes a first image of a first image plane, and an image sensed by second device B2 includes a second image of a second image plane. The first image includes a first point x that corresponds to coordinate point X and the second image includes a second point x' corresponding to coordinate point X'.

From those points X and X', using the theory of essential matrix decomposition (e.g., 8-point, 5-point methods), it is possible to calculate a relative orientation, and a relative translation (to a scale) between first device B1 and second device B2. two objects. Based on the relative orientation that is calculated/estimated, the devices B1 and B2 can triangulate a possible reflection point (e.g., a 3D point in world shown), such as coordinate point X, they are likely to have in common.

Referring again to FIG. 3, in some implementations, network entity 305 may receive positioning information 374 that includes or indicates channel impulse response 309. Based on channel impulse response 309 (e.g., time delay, AoA of multiple receive paths, etc.), network entity may determine a multipath component. Additionally, or alternatively, network entity 305 may perform localization of UE 115 based on coordinate point 367, the multipath component, or a combination thereof. In some implementations, network entity 305 may determine a position (e.g., 310) of UE 115.

Network entity 305 may generate location information 378 that includes or indicates coordinate point 367, a position of UE 115 determined based on coordinate point 367, the multipath component, an orientation of network entity 305, or a combination thereof. In some implementations, location information 378 includes or indicates assistance information, such as assistance information 366. Network entity 305 may transmit location information 378 to UE 115, core network 130, LMF 131, or a combination thereof.

It is noted that one or more operations described with reference to network entity 305 may be performed by core network 130 or LMF 131. For example, core network 130 or LMF 131 may be configured to determine the one or more matching points, the relative orientation based on the one or more matching points, the absolute orientation of UE 115, the translation t between UE 115 and network entity 305, coordinate point 367, the multipath component, a position of UE 115, or a combination thereof. Additionally, or alternatively, core network 130 or LMF 131 may be configured to transmit such information to network entity 305, UE 115, or a combination thereof.

UE 115 may receive location information 378 and determine a position (e.g., 310) of UE 115 based on the coordinate point 367. For example, UE 115 may localize itself—e.g., perform localization—based on coordinate point 367. To illustrate, UE 115 may use coordinate point 367 as a virtual anchor.

In some implementations, network entity 305 or UE 115 may adjust one or more beams of network entity 305 or UE 115, respectively. For example, network entity 305 or UE 115 may adjust as angle-of-arrival (AoA) or an angle-of-departure (AoD) based on coordinate point 367.

In some implementations, one or more operations described herein provide for a signaling exchange between devices, such as UE 115, network entity 305, core network 130, LMF 131, or a combination thereof, for inferring virtual access points using key points. The signaling exchange may be associated with uplink positioning, downlink positioning, or sidelink positioning.

In some implementations, parameters may be signaled inferring one or more virtual access points (reflection points) by UE 115, network entity 305 (e.g., base station 105 or an RSU), core network 130 (e.g., LMF 131), or a combination thereof. For example, the parameters may include a configuration, such as configuration information 370, that includes or indicates a key point detection method including one or more of Harris corner detector, FAST, SURF etc., a feature descriptor for one or more of the key points including one or more of ORB, SURF, or BRIEF, a number of key points and associated features to be provided, intrinsic parameters of a camera, or a combination thereof. In some implementations, the number of key points N to be provided based on an intensity metric for each key point specified as the sharpness of a corner as in Harris corner measure. For example, key points corresponding to the first N highest corners are requested. In some implementations, the requested key points are uniformly sampled in the image space, the raw/compressed image itself is requested, or a combination thereof.

In some implementations, network entity 305 transmits the configuration (e.g., 370) for sharing visually sensed features to UE 115 on a periodic, semi-static, or on-demand basis. Additionally, or alternatively, network entity 305 may transmit a positioning reference signal (PRS) (e.g., 372) for downlink positioning.

UE 115 generate and transmit the requested visual features based on the configuration. In some implementations, UE 115 transmits the visual features (e.g., 308) that include $N_1$ key points & features. Additionally, or alternatively, UE 115 transmits a channel impulse response (CIR) (e.g., 309) experienced by UE 115.

Network entity 305 may receive the visual features from UE 115 and may also determine its own visual features based on the configuration. Based on the visual features from UE 115 and the visual features of network entity 305, network entity 305 obtains N ($N \leq N_1$) matching points between the first image captured by UE 115 and the second image captured by network entity 305. Network entity 305 then determines the relative pose based on N matching points. Network entity 305 determines the absolute orientation (i.e., $R_v$) of UE 115 based on an orientation of network entity 305 (known to network entity 305) and the relative orientation calculate for UE 115. In some implementations, network entity 305 may also determine the translation t (to a scale) between network entity 305 and UE 115. In one case, the translation t between network entity 305 and UE 115 is known from ranging measurements.

In some implementation, network entity 305 may determine the virtual access 3D point, such as coordinate point 367, from one pair of key points. For example, network entity 305 may determine a 3D point $X_i$ (in a reference network entity coordinate system) from $R_v$, absolute orientation of itself $R_g$, and translation t, for a given matching pair of key point ($x_{iv}$, $x_{ig}$) from UE 115 and network entity 305, respectively. That is, the 3D point $X_i$ (e.g., 367) is calculated from the tuple $\{R_v, R_g, t, x_{iv}, x_{ig}\}$. To illustrate, let $(R_1, C_1)$ and $(R_2, C_2)$ be the rotation and translation of image capture device 319 and image capture device 359, respectively, with respect to a common frame of reference (e.g., world coordinates). Let $P_i = K_i R_i [I - C_i]$ be a projection matrix of image frame i, where K represents an intrinsic matrix, and I is an identity matrix. Let $x_i = [x_i', y_i', 1]$ be the homogenous coordinate representation of a pixel location $[x_i', y_i']$ in image frame-i (i=1, 2).

The 3D point X corresponding to pixel $x_1$ of image frame-1, and $x_2$ of image frame-2 can be obtained by solving the following least square equation:

$$\begin{bmatrix} [x_1]_\times P_1 \\ [x_2]_\times P_2 \end{bmatrix} X = 0,$$

where $[x_i]_\times$ is the skew symmetric matrix representation of $x_i$

Network entity 305 may determine a multipath component based on channel impulse response 309. For example, network entity 305 may determines a dominant multipath component (e.g., having a path loss is less than a threshold), and a delay is greater than a delay between a location of network entity 305 and the inferred 3D point $X_i$ (e.g., 367).

Network entity 305 may transmit an indication of the 3D point $X_i$ and the multipath component associated to $X_i$ to UE 115. For example, network entity 305 may transmit location information 378 that includes or indicates the 3D point $X_i$ and the multipath component associated to $X_i$.

In some implementation, network entity 305 may determine the virtual access 3D point, such as coordinate point 367, from one pair of key points. For example, network entity 305 may calculate a virtual access centroid 3D point $\tilde{X}$. To illustrate, let $\{\tilde{x}_i=(x_{iv}, x_{ig})\}$, (i=1 ... n) ben matching key points between UE 115 and network entity, where n is a positive integer greater than 1. These points may be chosen in such a way that the distance between the features corresponding to $x_{iv}$ & $x_{ig}$ are very close to each other. Accordingly, these points have high correlation across image frames of UE 115 and network entity 305. Further, these points are close to each other such that one 'representative' 3D point can be modeled to represent all the closely located corresponding two-dimensional image points.

A 3D point $X_i$ is found for every $\{R_v, R_g, t, x_{iv}, x_{ig}\}$. The centroid virtual access 3D point is determined as $$\tilde{X} = \left(\frac{1}{n}\right)\sum X_i.$$

Network entity 305 may transmit an indication of the $\tilde{X}$ and a multipath component associated to $\tilde{X}$ to UE 115. For example, network entity 305 may transmit location information 378 that includes or indicates $\tilde{X}$ and the multipath component associated to $\tilde{X}$.

Based on the inferred virtual access 3D point(s) determined through any of the operations or techniques described (e.g., one key point pair or multiple key point pairs), a range of UE 115, or a combination thereof, network entity 305 can adapt the transmit beam to have a specific angle of departure in order to obtain a desired angle of reflection at the virtual access 3D point $X_i$ or $\tilde{X}$.

In some implementations, either network entity 305 or LMF 131 is configured to provide one or more 3D virtual access points (e.g., 367) to UE 115. When LMF calculates the one or more 3D virtual access points, both UE 115 and network entity 305 send their key points & features to LMF 131. LMF 131 provides the inferred 3D virtual access point to UE 115, network entity 305, or a combination thereof. An example of network entity 305 providing the 3D virtual access points for UE-based positioning is describe further herein at least with reference to FIG. 5. An example of LMF 131 providing 3D virtual access points to UE 115 is described further herein at least with reference to FIG. 6.

In some implementations, network entity 305 and UE 115 visual features to LMF 131 and LMF 131 calculates the 3D virtual access points. Additionally, LMF 131 may use channel impulse response 309 provided by UE 115 to localize UE 115. An example of such operations performed by LMF 131 is described further herein at least with reference to FIG. 7.

In some implementations, based on the signaled reflection points, UE 115 adapts its receive beam to perform coarse beam alignment. An example of such operations by UE 115 is described further herein at least with reference to FIG. 8.

In some implementations, UE 115 or LMF 131 are configured to transmit a request for key-points in certain directions (e.g., towards the north-east, or to the left of this other identified key point) as a part a visual feature configuration (e.g., 370), which is described with reference to at least FIGS. 5-8. Additionally, or alternatively, one or more key points may be intentionally created or identify. For example, the one or more key points may correspond to a known structure or can be created, e.g., by a flashing LED lights display, flashing in a particular pattern, and asking nodes (e.g., UE 115 or network entity 305) to photograph them. To illustrate, the one or more key points may be included in displays for art/advertising by adding artificially created features that would help with key point-based positioning.

As described with reference to FIG. 3, the present disclosure provides techniques for supporting visual sensing for positioning. The techniques described may enable a position of UE 115 to be determined when a line-of-sight is not present between UE 115 and network entity 305 (e.g., a base station, an RSU, or another UE). Additionally, the techniques may enable network entity 305 or UE 115 to adjust one or more beams to improve transmission or reception of a reflected signal and therefore compensate for interference or an obstruction. Additionally, by using an image capture device of UE 115 to determine coordinate point 367 (e.g., a virtual access point), a position of UE 115 may be able to be determined based on only one network entity 305 (e.g., a real access point).

Figure 5:
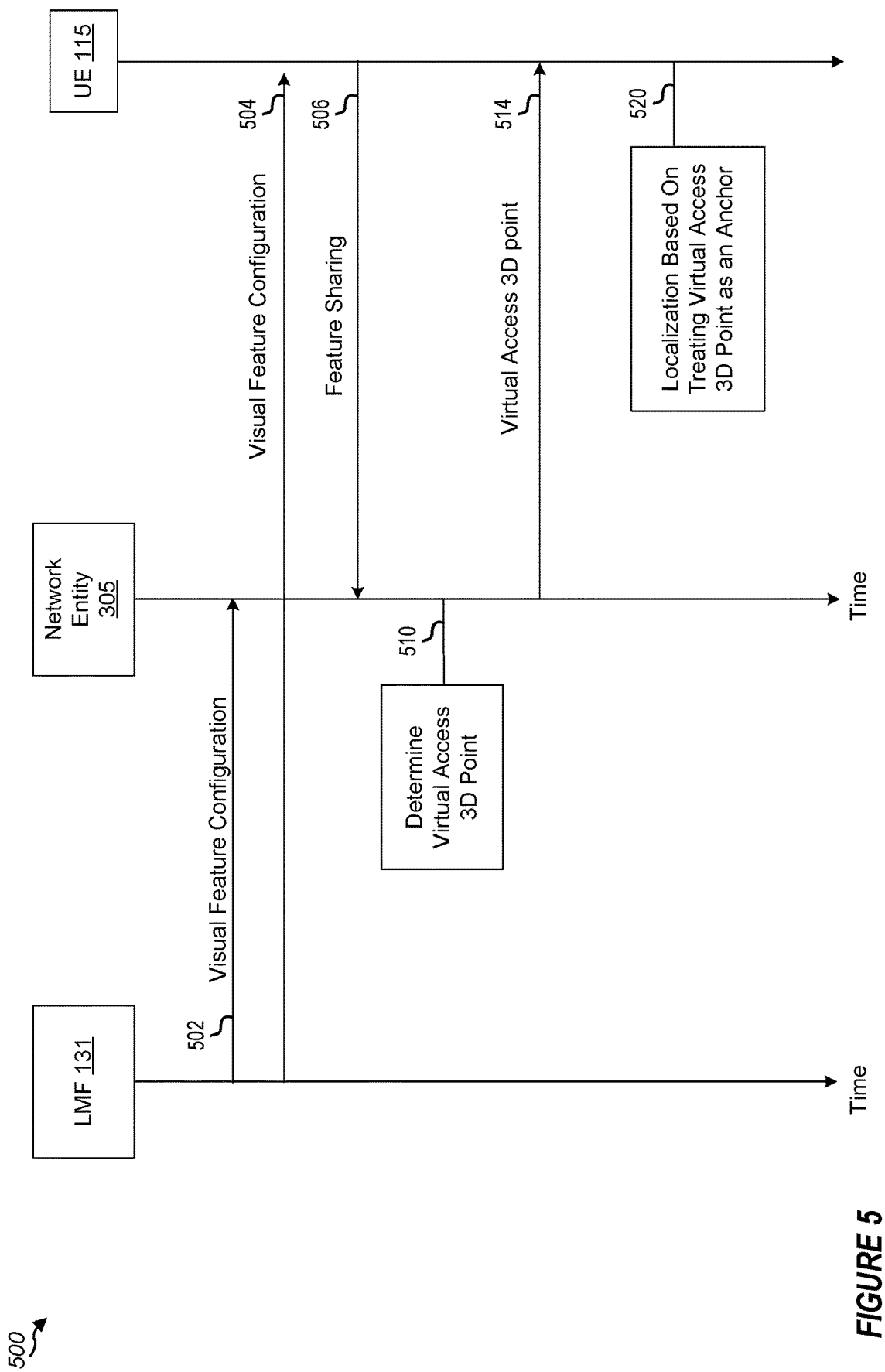
FIG. 5 is a ladder diagram illustrating an example of visual sensing for positioning according to one or more aspects.
Figure 6:
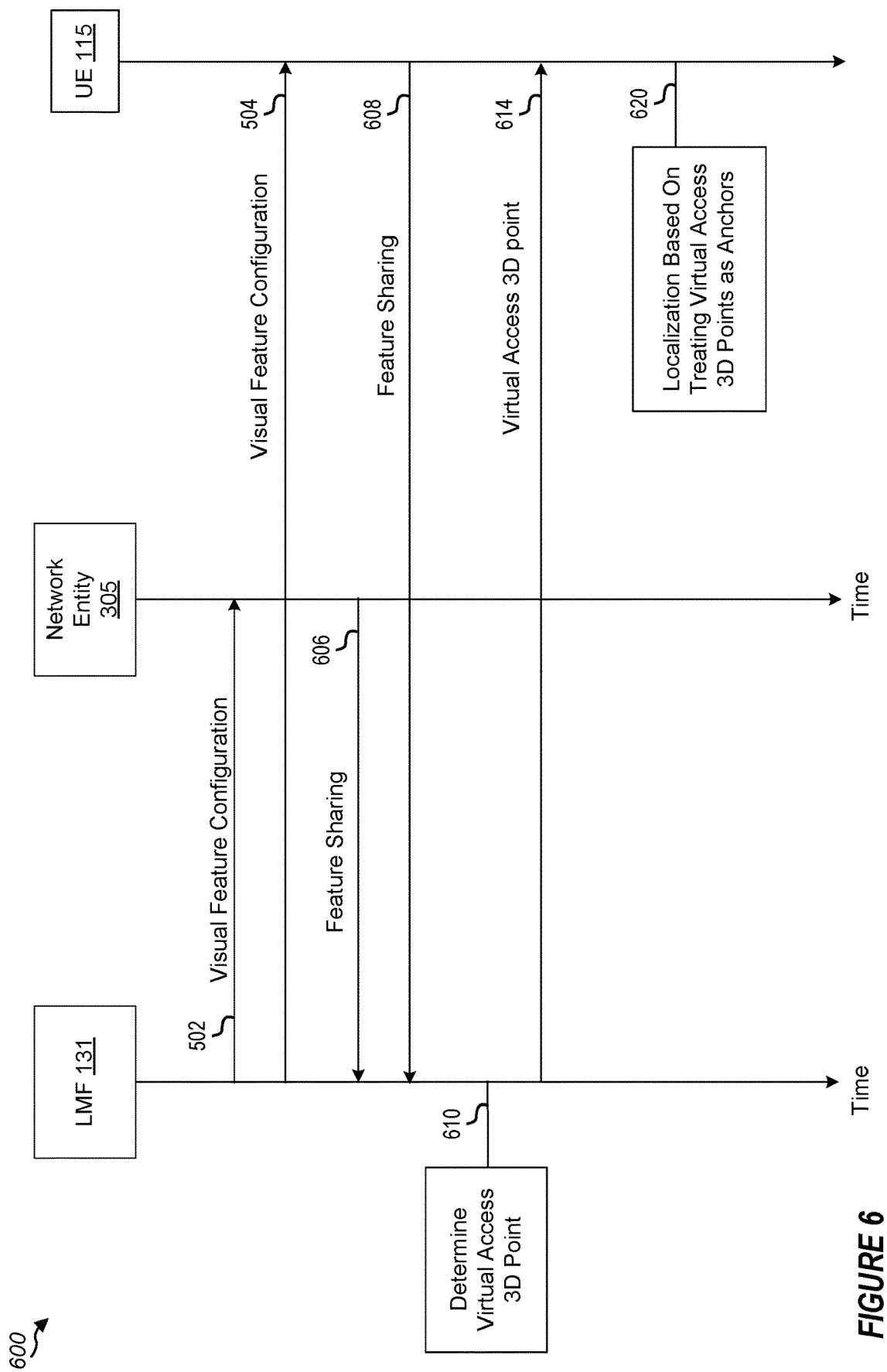
FIG. 6 is a ladder diagram illustrating another example of visual sensing for positioning according to one or more aspects.
Figure 7:
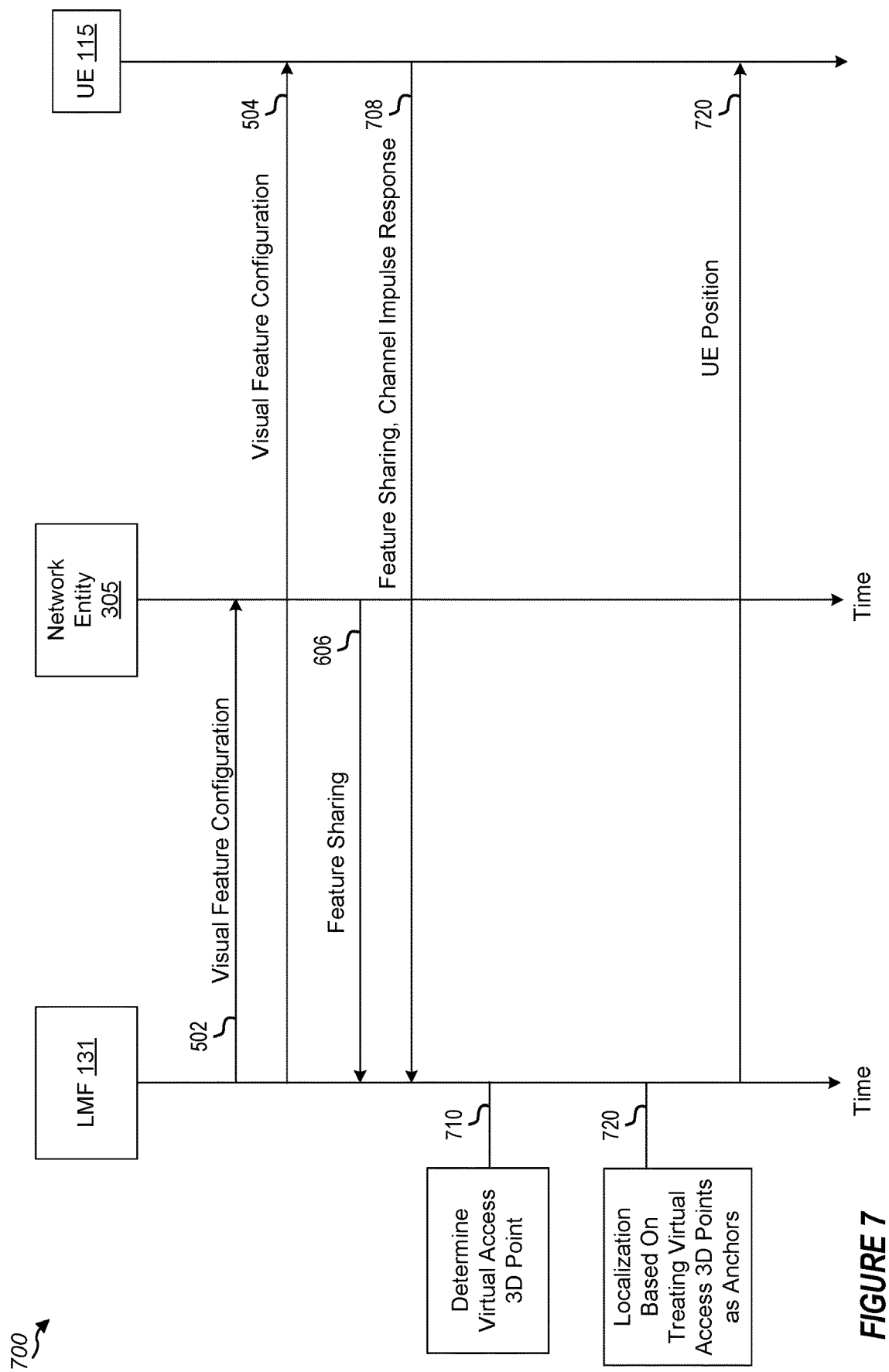
FIG. 7 is a ladder diagram illustrating another example of visual sensing for positioning according to one or more aspects.
Figure 8:
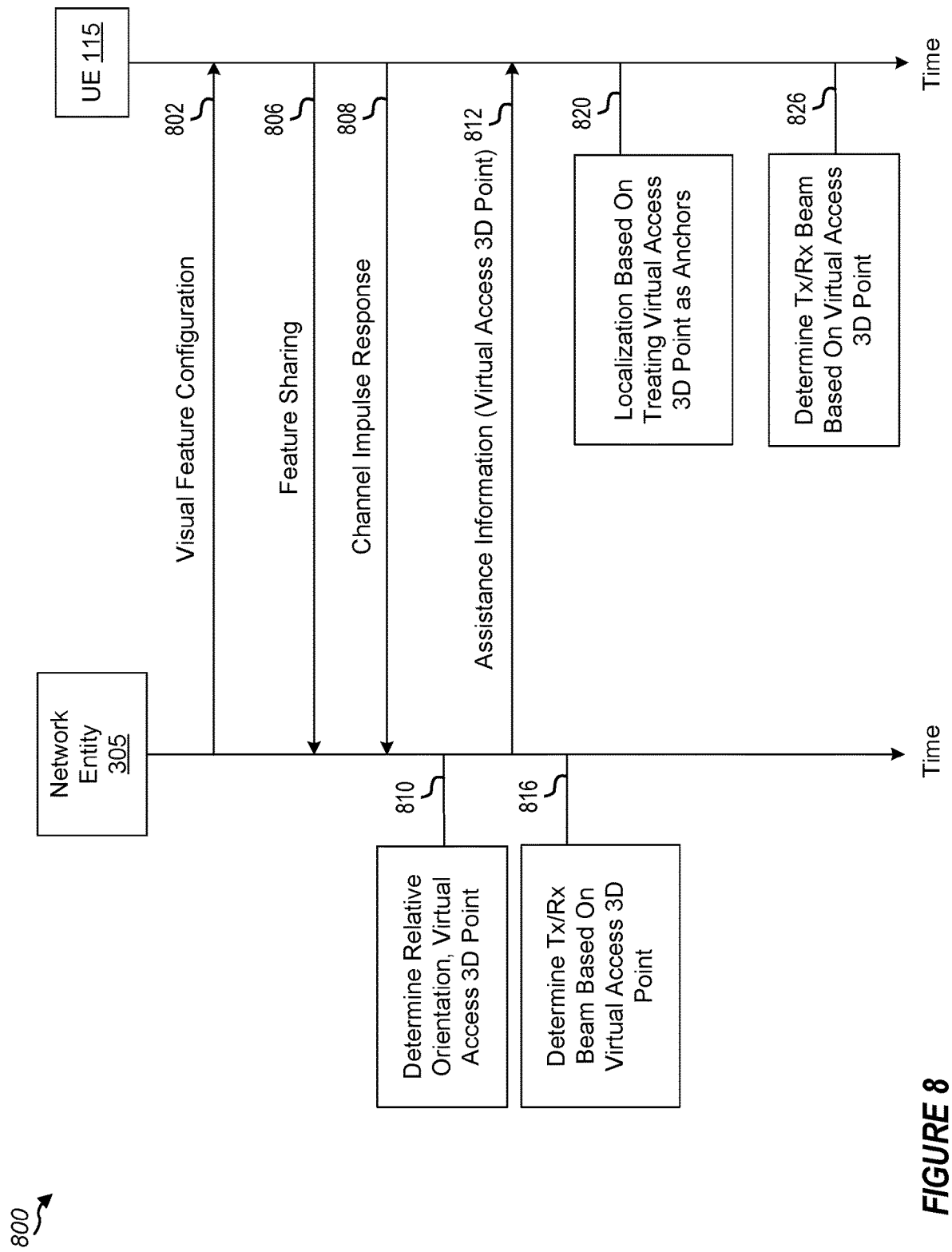
FIG. 8 is a ladder diagram illustrating another example of visual sensing for positioning according to one or more aspects.

FIGS. 5-8 are ladder diagrams each illustrating examples of visual sensing for positioning according to one or more aspects. As shown in FIGS. 5-7, a system of the ladder diagram includes LMF 131, network entity 305, and UE 115. As shown in FIG. 8, a system of the ladder diagram includes network entity 305 and UE 115. Network entity 305 may include or correspond to base station 105, a roadside unit, or another UE. LMF 131 may include or correspond to core network 130. Although shown and described as being separate, in some implementations, network entity 305 and LMF 131 may be included in the same device, such as a single server or a distributed server system. UE 115, network entity 305, and LMF 131 may include one or more components and be configured to perform one or more operations, as described with reference to FIGS. 1-4.

Referring to FIG. 5, FIG. 5 is an example of a system 500 that supports visual sensing for positioning according to one or more aspects. During operation, at 502, LMF 131 transmits a visual feature configuration to network entity 305. The visual feature configuration transmitted to network entity 305 may include or correspond to configuration information 370.

At 504, LMF 131 transmits a visual feature configuration to UE 115. The visual feature configuration transmitted to UE 115 may include or correspond to configuration information 370. The visual feature configuration transmitted to UE 115 may be transmitted before, after, or concurrently with the visual feature configuration transmitted to network entity 305.

At 506, UE 115 transmits feature sharing information to network entity 305. The feature sharing information may include or correspond to information 306, feature 308, or position information 374. The feature sharing information may be generated by UE 115 based on the visual feature configuration received by UE 115, based on an image captured by an image capture device associated with or included in UE 115, or a combination thereof.

Based on the visual feature configuration received by network entity 305 from UE 115, feature sharing information generated by network entity 305, or a combination thereof, network entity 305 may determine a virtual 3D access point, at 510. The virtual 3D access point may include or correspond to location information 364, assistance information 366, or coordinate point 367.

At 514, network entity 305 transmits the virtual access 3D point to UE 115. For example, the UE 115 may receive location information 378 that includes or indicates the virtual access 3D point.

At 520, UE 115 performs localization based on treating the virtual access 3D point as an anchor. In some implementations, UE 115 may perform localization to determine a position of UE 115, such as position 310.

Referring to FIG. 6, FIG. 6 is an example of a system 600 that supports visual sensing for positioning according to one or more aspects. During operation, LMF 131 transmits a visual feature configuration to network entity 305, at 502, and transmits a visual feature configuration to UE 115, at 504, as described with reference to FIG. 5.

At 606, network entity 305 transmits feature sharing information to LMF 131. The feature sharing information transmitted by network entity may include or correspond to one or more features. The feature sharing information may be generated by network entity 305 based on the visual feature configuration received by network entity 305, based on an image captured by an image capture device associated with or included in network entity 305, or a combination thereof.

At 608, UE 115 transmits feature sharing information to LMF 131. The feature sharing information may include or correspond to information 306, feature 308, or position information 374. The feature sharing information may be generated by UE 115 based on the visual feature configuration received by UE 115, based on an image captured by an image capture device associated with or included in UE 115, or a combination thereof. The feature sharing information transmitted by UE 115 may be transmitted before, after, or concurrently with the feature sharing information transmitted by network entity 305.

Based on the feature sharing information received by LMF 131 from network entity 305, UE 115, or a combination thereof, LMF 131 may determine a virtual 3D access point, at 610. The virtual 3D access point may include or correspond to location information 364, assistance information 366, coordinate point 367, or location information 378.

At 614, LMF 131 transmits the virtual access 3D point to UE 115. For example, the UE 115 may receive location information 378 that includes or indicates the virtual access 3D point.

At 620, UE 115 performs localization based on treating the virtual access 3D point as an anchor. In some implementations, UE 115 may perform localization to determine a position of UE 115, such as position 310.

Referring to FIG. 7, FIG. 7 is an example of a system 700 that supports visual sensing for positioning according to one or more aspects. During operation, LMF 131 transmits a visual feature configuration to network entity 305, at 502, and transmits a visual feature configuration to UE 115, at 504, as described with reference to FIG. 5. Additionally, network entity 305 transmits feature sharing information to LMF 131, at 606, as described with reference to FIG. 6.

At 708, UE 115 transmits feature sharing information and a channel impulse response to LMF 131. The feature sharing information may include or correspond to information 306, feature 308, or position information 374. The feature sharing information may be generated by UE 115 based on the visual feature configuration received by UE 115, based on an image captured by an image capture device associated with or included in UE 115, or a combination thereof. The channel impulse response may include or correspond to information 306, channel impulse response 309, or position information 374. In some implementations, the channel impulse response is determined by UE 115 based on a positioning reference signal, such as positioning reference signal 372, transmitted by network entity 305. The feature sharing information and channel impulse response may be generated together or separately. Additionally, or alternatively, the feature sharing information, channel impulse response, or a combination thereof transmitted by UE 115 may be transmitted before, after, or concurrently with the feature sharing information transmitted by network entity 305.

Based on the feature sharing information received by LMF 131 from network entity 305, the feature sharing information received by LMF 131 from UE 115, the channel impulse response received by LMF 131 from UE 115, or a combination thereof, LMF 131 may determine a virtual 3D access point, at 710. The virtual 3D access point may include or correspond to location information 364, assistance information 366, coordinate point 367, or location information 378.

At 720, LMF 131 performs localization based on treating the virtual access 3D point as an anchor. In some implementations, LMF 131 may perform localization to determine a position of UE 115, such as position 310. At 722, LMF 131 transmits an indication of the position of UE 115 to UE 115.

Referring to FIG. 8, FIG. 8 is an example of a system 800 that supports visual sensing for positioning according to one or more aspects. During operation, at 802, network entity 305 transmits a visual feature configuration to UE 115. The visual feature configuration transmitted to UE 115 may include or correspond to configuration information 370.

At 806, At 506, UE 115 transmits feature sharing information to network entity 305. The feature sharing information may include or correspond to information 306, feature 308, or position information 374. The feature sharing information may be generated by UE 115 based on the visual feature configuration received by UE 115, based on an image captured by an image capture device associated with or included in UE 115, or a combination thereof.

At 808, UE 115 transmits a channel impulse response to network entity 305. The channel impulse response may include or correspond to information 306, channel impulse response 309, or position information 374. In some implementations, the channel impulse response is determined by UE 115 based on a positioning reference signal, such as positioning reference signal 372, transmitted by network entity 305. The feature sharing information may be transmitted by UE 115 before, after, or concurrently with the channel impulse response transmitted by UE 115.

At 810, network entity 305 determines a relative orientation and a virtual 3D access point. For example, the virtual 3D access point may include or correspond to location information 364, assistance information 366, or coordinate point 367. In some implementations, network entity 305 may determine the virtual access 3D point based on visual feature configuration received by network entity 305 from UE 115, feature sharing information generated by network entity 305, or a combination thereof.

At 812, network entity 305 transmits assistance information to UE 115. For example, the assistance information may include or correspond to location information 364, assistance information 366, or coordinate point 367. In some implementations, the assistance information includes or indicates the virtual access 3D point. For example, the UE 115 may receive location information 378 that includes or indicates the virtual access 3D point.

At 816, network entity 305 determines a Tx/Rx beam based on the virtual access 3D point. In some implementations, network entity 305 may additionally, or alternatively, determine the Tx/Rx beam based on the channel impulse response received from UE 115. Although network entity 305 is described as determining the Tx/Rx beam after transmission of the assistance information, the Tx/Rx beam may be determined before, after, or concurrently with transmission of the assistance information.

At 820, UE 115 performs localization based on treating the virtual access 3D point as an anchor. In some implementations, UE 115 may perform localization to determine a position of UE 115, such as position 310. Although UE 115 is described as performing localization after network entity 305 determines the Tx/Rx beam, UE 115 may perform localization before, after, or concurrently with network entity determining the Tx/Rx beam.

At 826, UE 115 determines a Tx/Rx beam based on the virtual access 3D point. In some implementations, UE 115 may additionally, or alternatively, determine the Tx/Rx beam based on the channel impulse response transmitted by UE 115 at 808. Although UE 115 is described as performing localization after localization, UE 115 may perform localization before, after, or concurrently with localization.

Figure 9:
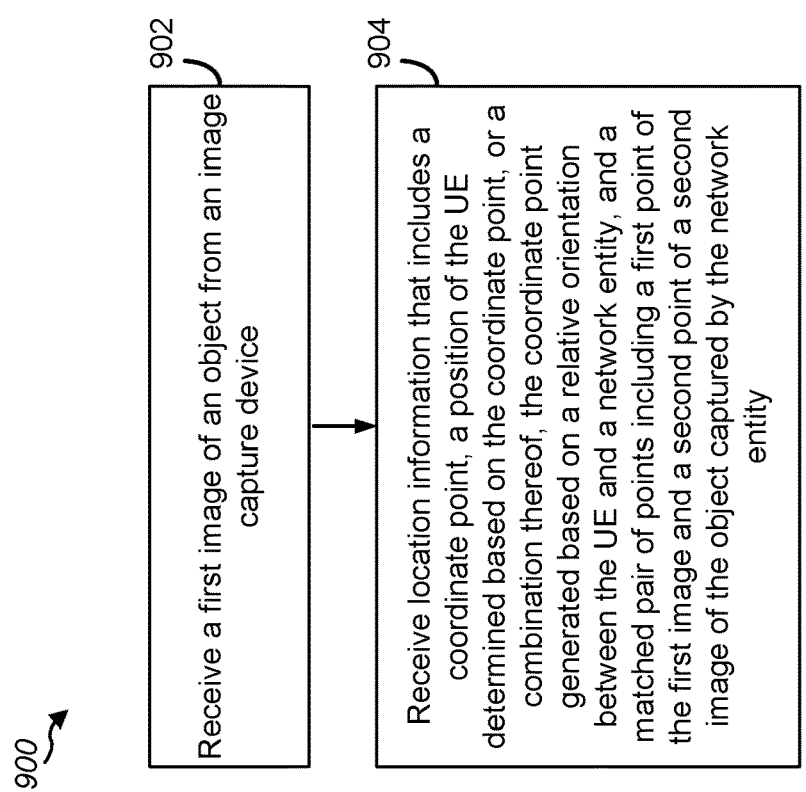
FIG. 9 is a flow diagram illustrating an example process that supports visual sensing for positioning according to one or more aspects.

FIG. 9 is a flow diagram illustrating an example process 900 that supports visual sensing for positioning according to one or more aspects. Operations of process 900 may be performed by a UE, such as UE 115 described above with reference to FIGS. 1-8 or a UE described with reference to FIG. 10. For example, example operations (also referred to as "blocks") of process 900 may enable UE 115 to support visual sensing for positioning.

In block 902, the UE receives a first image of an object from an image capture device. For example, the image capture device may include image capture device 319. The object may include or correspond to object 390. In some implementations, the UE captures a first image by the first image capture device of the UE.

In block 904, the UE receives location information that includes a coordinate point, a position of the UE determined based on the coordinate point, or a combination thereof. For example, the location information may include or correspond to location information 378. Location information may be received from core network 130, LMF 131, a location management function, base station 105, a roadside unit, or network entity 305. The position may include or correspond to position 310 or 368. The coordinate point may include or correspond to coordinate point 367. In some implementations, the coordinate point associated with a reflection point. The coordinate point may be generated based on a relative orientation between the UE and a network entity, and a matched pair of points including a first point of the first image and a second point of a second image of the object captured by the network entity. The network entity may include or correspond to base station 105, a roadside unit, or network entity 305. In some implementations, the location information includes or indicates assistance information. Additionally, or alternatively, the coordinate point includes or indicates a virtual access 3D point. In some implementations, the location information indicates the coordinate point and a multipath component based on a channel impulse response measured by the UE.

In some implementations, the UE receives configuration information associated with one or more visual features. The configuration information may include or correspond to configuration information 370. The configuration information indicates a key point detection technique, a feature descriptor of one or more key points, a number of the one or more key points, a location or direction of the one or more key points, a parameter for an image capture device, or a combination thereof. The UE may determine the first point, such as a key point, based on the configuration. Additionally, or alternatively the UE may transmit position information that indicates the first point, a feature descriptor, or a combination thereof. For example, the position information may include or correspond to positioning information 374.

In some implementations, the UE receives a positioning reference signal from the network entity. For example, the positioning reference signal may include or correspond to positioning reference signal. The UE may determine a channel impulse response based on the positioning reference signal. The channel impulse response may include or correspond to channel impulse response 309. Additionally, or alternatively, the UE may transmit positioning information that includes or indicates the channel impulse response. For example, the positioning information may include or correspond to positioning information 374.

In some implementations, the UE determines the position of the UE based on the location information. Additionally, or alternatively, the UE may adjust an angle of a beam of the UE based on the coordinate point. For example, the UE may adjust an angle of a receive beam to have an angle of departure associated with the coordinate point. As another example, the UE may adjust a transmit beam based on the coordinate point.

Figure 10:
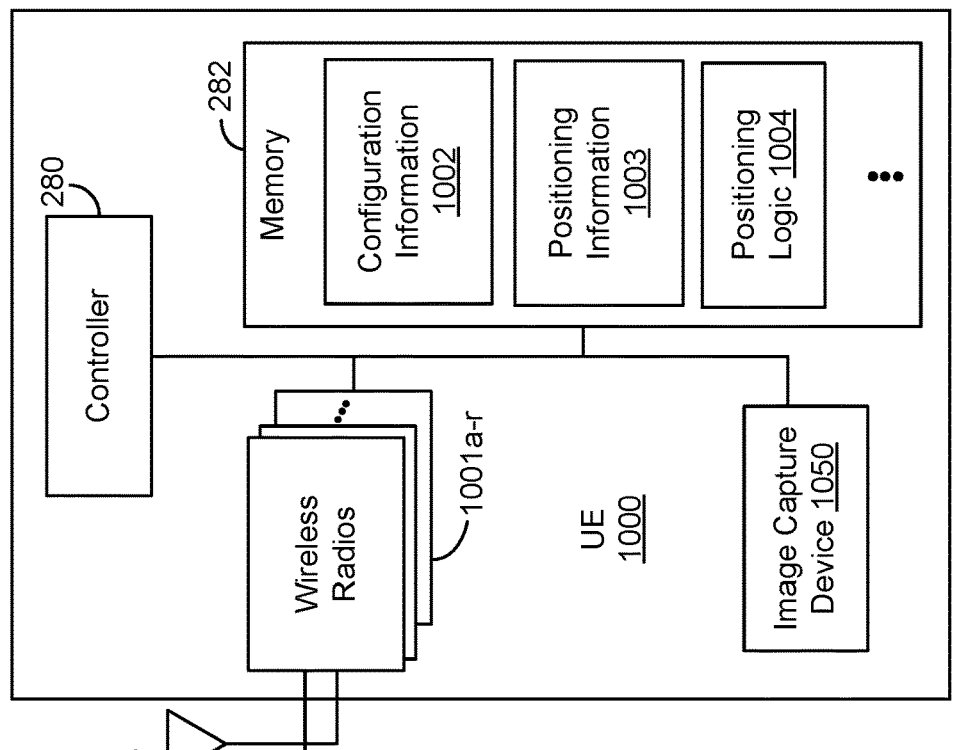
FIG. 10 is a block diagram of an example UE that supports visual sensing for positioning according to one or more aspects.

FIG. 10 is a block diagram of an example UE 1000 that supports visual sensing for positioning according to one or more aspects. UE 1000 may be configured to perform operations, including the blocks of a process described with reference to FIG. 9. In some implementations, UE 1000 includes the structure, hardware, and components shown and described with reference to UE 115 of FIGS. 1-8. For example, UE 1000 includes controller 280, which operates to execute logic or computer instructions stored in memory 282, as well as controlling the components of UE 1000 that provide the features and functionality of UE 1000. UE 1000, under control of controller 280, transmits and receives signals via wireless radios 1001a-r and antennas 252a-r. Wireless radios 1001a-r include various components and hardware, as illustrated in FIG. 2 for UE 115, including modulator and demodulators 254a-r, MIMO detector 256, receive processor 258, transmit processor 264, and TX MIMO processor 266.

Figure 12:
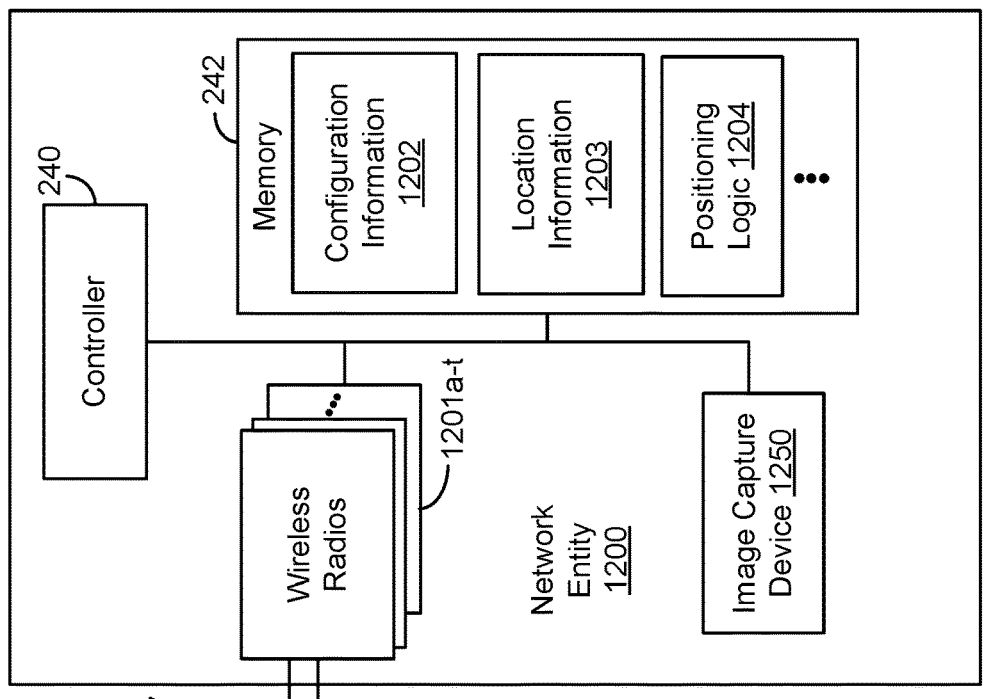
FIG. 12 is a block diagram of an example base station that supports visual sensing for positioning according to one or more aspects.

As shown, memory 282 may include configuration information 1002, positioning information 1003, and positioning logic 1004. Configuration information 1002 may include or correspond to configuration information 370. Positioning information 1003 may include or correspond to information 306, feature 308, channel impulse response 309, position 310, or positioning information 374. Positioning logic 1004 may be configured to determine positioning information 1003. UE 1000 may receive signals from or transmit signals to one or more network entities, such as base station 105, core network 130, LMF 131, network entity 305 of FIGS. 3-8 or a network entity as illustrated in FIG. 12.

Figure 11:
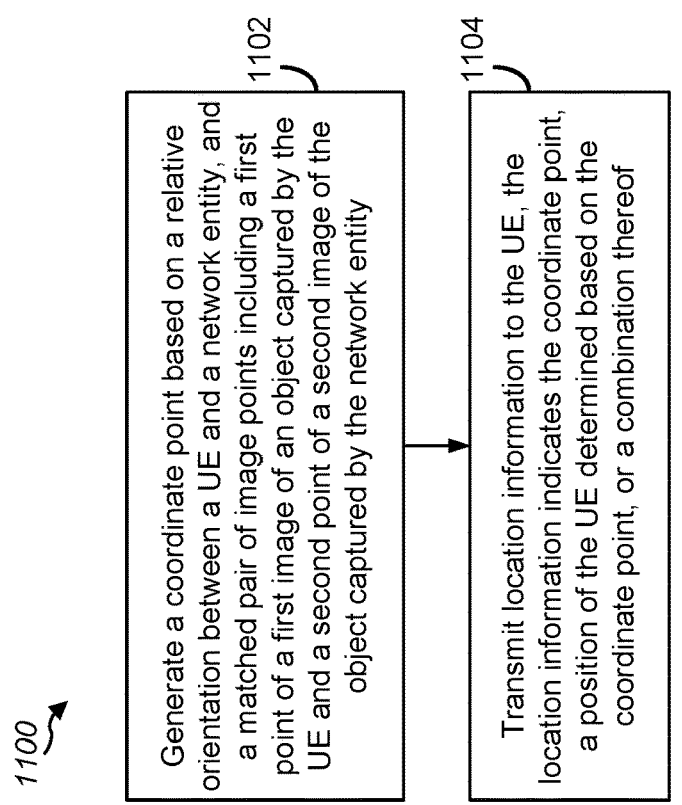
FIG. 11 is a flow diagram illustrating an example process that supports visual sensing for positioning according to one or more aspects.

FIG. 11 is a flow diagram illustrating an example process 1100 that supports visual sensing for positioning according to one or more aspects. Operations of process 1100 may be performed by a network node, such as core network 130, LMF 131, network entity 305 described above with reference to FIGS. 1-8 or a network entity as described with reference to FIG. 12. For example, example operations of process 1100 may enable base station 105 to support visual sensing for positioning.

At block 1102, the network node generates a coordinate point based on a relative orientation between a UE and a network entity, and a matched pair of image points including a first point of a first image of an object captured by the UE and a second point of a second image of the object captured by the network entity. The coordinate point may include or correspond to coordinate point 367. The UE may include or correspond to UE 115. The network entity may include or correspond to base station 105, a roadside unit, network entity 305, or another UE. In some implementations, the network node includes the network entity. Accordingly, in some such implementations, the network node captures the second image.

At block 1104, the network node transmits location information to the UE. The location information may include or correspond to location information 378. The location information may include or indicate the coordinate point, a position of the UE determined based on the coordinate point, or a combination thereof. The position may include or correspond to position 310 or 368.

In some implementations, the network node generates configuration information associated with one or more visual features. The configuration information 370 may include or correspond to configuration information 370. The configuration information may include or indicate a key point detection technique, a feature descriptor of one or more key points, a number of the one or more key points, a location or direction of the one or more key points, a parameter for an image capture device, or a combination thereof. The network node may transmit the configuration information to the UE, the network entity, or a combination thereof.

In some implementations, the network node receives positioning information from the UE. The positioning information may include or correspond to positioning information 374. The positioning information may include or indicate feature information, a channel impulse response, or a combination thereof. The feature information and the channel impulse response may include or correspond to feature 308 and channel impulse response 309, respectively. The feature information may be based on the first image. Additionally, or alternatively, the feature information may be generated based on the configuration information transmitted to the UE.

In some implementations, the network node determines one or more matched pairs of image points based on the first image and the second image. The one or more matched pairs of image points include the matched pair of image points based on the first point and the second point. The network node may determine, based on the one or more matched pair of image points, a relative pose. The network node may determine the coordinate point based on the relative pose and a translation between the network entity and the UE.

In some implementations, the network node transmits a positioning reference signal. The position reference signal may include or correspond to positioning reference signal 372. Additionally, or alternatively, the network node may receive a channel impulse response from the UE. For example, the channel impulse response may include or correspond to channel impulse response 309. The channel impulse response may be based on the positioning reference signal. In some implementations, the network node may determine a multipath component based on the channel impulse response. The location information, such as location information 378, may further indicate the multipath component.

In some implementations, the network node may determine the position of the UE based on the coordinate point. For example, the network node may determine the position by localizing the UE based on the coordinate point. Additionally, or alternatively, in some implementations, the network node may adjust an angle of a beam of the network entity based on the coordinate point. For example, the beam may be a transmit beam or a receive beam.

FIG. 12 is a block diagram of an example network entity 1200 that supports visual sensing for positioning according to one or more aspects. Network entity 1200 may be configured to perform operations, including the blocks of process 1100 (of network node) described with reference to FIG. 11. In some implementations, network entity 1200 includes the structure, hardware, and components shown and described with reference to base station 105 of FIGS. 1-8. For example, network entity 1200 may include controller 240, which operates to execute logic or computer instructions stored in memory 242, as well as controlling the components of network entity 1200 that provide the features and functionality of network entity 1200. Network entity 1200, under control of controller 240, transmits and receives signals via wireless radios 1201a-t and antennas 234a-t. Wireless radios 1201a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include configuration information 1202, location information 1203, and positioning logic 1204. Configuration information 1202 may include or correspond to configuration information 370. Location information 1203 may include or correspond to location information 364, assistance information 366, coordinate point 367, position 368, or location information 378. Positioning logic 1204 may be configured to generate location information 1203. Network entity 1200 may receive signals from or transmit signals to one or more UEs, such as UE 115 of FIGS. 1-8 or UE 1000 of FIG. 10.

It is noted that one or more blocks (or operations) described with reference to FIG. 9 or 11 may be combined with one or more blocks (or operations) described with reference to another of the figures. For example, one or more blocks (or operations) of FIG. 9 may be combined with one or more blocks (or operations) of FIG. 11. As another example, one or more blocks associated with FIG. 9 or 11 may be combined with one or more blocks associated with FIG. 5, 6, 7, or 8. As another example, one or more blocks associated with FIG. 9 or 11 may be combined with one or more blocks (or operations) associated with FIGS. 1-4. Additionally, or alternatively, one or more operations described above with reference to FIGS. 1-8 may be combined with one or more operations described with reference to FIG. 10 or 12.

In one or more aspects, techniques for supporting visual sensing for positioning may include additional aspects, such as any single aspect or any combination of aspects described below or in connection with one or more other processes or devices described elsewhere herein. In a first aspect, techniques for supporting visual sensing for positioning may include receiving a first image of an object from an image capture device. The techniques may further include receiving location information that includes a coordinate point, a position of a UE determined based on the coordinate point, or a combination thereof. The coordinate point is generated based on a relative orientation between the UE and a network entity, and a matched pair of points including a first point of the first image and a second point of a second image of the object captured by the network entity. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques further include capturing a first image by the first image capture device of the UE.

In a third aspect, in combination with the first aspect or the second aspect, the location information includes assistance information.

In a fourth aspect, in combination with one or more of the first aspect through the third aspect, the coordinate point includes a virtual access 3D point.

In a fifth aspect, in combination with one or more of the first aspect through the fourth aspect, the techniques further include receiving configuration information associated with one or more visual features.

In a sixth aspect, in combination with the fifth aspect, the techniques further include determining the first point based on the configuration information, the first point including a key point.

In a seventh aspect, in combination with the sixth aspect, the techniques further include transmitting position information that indicates the first point, a feature descriptor, or a combination thereof.

In an eighth aspect, in combination with one or more of the fifth aspect through the seventh aspect, the configuration information indicates a key point detection technique, a feature descriptor of one or more key points, a number of the one or more key points, a location or direction of the one or more key points, a parameter for an image capture device, or a combination thereof.

In a ninth aspect, in combination with one or more of the first aspect through the eighth aspect, the techniques further include receiving a positioning reference signal from the network entity.

In a tenth aspect, in combination with the ninth aspect, the techniques further include determining a channel impulse response based on the positioning reference signal.

In an eleventh aspect, in combination with the tenth aspect, the techniques further include transmitting positioning information that indicates the channel impulse response.

In a twelfth aspect, in combination with one or more of the first aspect through the eleventh aspect, the location information indicates the coordinate point and a multipath component based on a channel impulse response measured by the UE.

In a thirteenth aspect, in combination with one or more of the first aspect through the twelfth aspect, the techniques further include determining the position of the UE based on the location information.

In a fourteenth aspect, in combination with the thirteenth aspect, the techniques further include adjusting an angle of a receive beam to have an angle of departure associated with the coordinate point. In implementations, the coordinate point is associated with a reflection point.

In a fifteenth aspect, in combination with one or more of the first aspect through the fourteenth aspect, the network entity includes a base station, a roadside unit, or another UE.

In a sixteenth aspect, in combination with one or more of the first aspect through the sixteenth aspect, the location information is received from a location management function.

In one or more aspects, techniques for supporting visual sensing for positioning may include additional aspects, such as any single aspect or any combination of aspects described below or in connection with one or more other processes or devices described elsewhere herein. In a seventeenth aspect, techniques for supporting visual sensing for positioning may include generating a coordinate point based on a relative orientation between a UE and a network entity, and a matched pair of image points including a first point of a first image of an object captured by the UE and a second point of a second image of the object captured by the network entity. The techniques may further include transmitting location information to the UE. The location information indicates the coordinate point, a position of the UE determined based on the coordinate point, or a combination thereof. In some examples, the techniques in the seventeenth aspect may be implemented in a method or process. In some other examples, the techniques of the seventeenth aspect may be implemented in a wireless communication device, such as network entity or a network node, which may include a roadside unit, a component of a roadside unit, a base station, or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In an eighteenth aspect, in combination with the seventeenth aspect, the techniques further include generating configuration information associated with one or more visual features.

In a nineteenth aspect, in combination with the eighteenth aspect, the techniques further include transmitting the configuration information to the UE, the network entity, or a combination thereof.

In a twentieth aspect, in combination with one or more of the eighteenth aspect or the nineteenth aspect, the configuration information indicates a key point detection technique, a feature descriptor of one or more key points, a number of the one or more key points, a location or direction of the one or more key points, a parameter for an image capture device, or a combination thereof.

In a twenty-first aspect, in combination with one or more of the eighteenth aspect through the twentieth aspect, the techniques further include receiving positioning information from the UE.

In a twenty-second aspect, in combination with the twenty-first aspect, the positioning information includes feature information, a channel impulse response, or a combination thereof.

In a twenty-third aspect, in combination with the twenty-second aspect, the feature information is based on the first image, the feature information generated based on the configuration information transmitted to the UE.

In a twenty-fourth aspect, in combination with one or more of the seventeenth aspect through the twenty-third aspect, the techniques further include capturing the second image.

In a twenty-fifth aspect, in combination with one or more of the seventeenth aspect through the twenty-fourth aspect, the techniques further include determining one or more matched pairs of image points based on the first image and the second image, the one or more matched pairs of image points including the matched pair of image points based on the first point and the second point.

In a twenty-sixth aspect, in combination with the twenty-fifth aspect, the techniques further include determining, based on the one or more matched pair of image points, a relative pose.

In a twenty-seventh aspect, in combination with the twenty-sixth aspect, the techniques further include determining the coordinate point based on the relative pose and a translation between the network entity and the UE.

In a twenty-eighth aspect, in combination with one or more of the seventeenth aspect through the twenty-seventh aspect, the techniques further include transmitting a positioning reference signal.

In a twenty-ninth aspect, in combination with the twenty-eighth aspect, the techniques further include receiving a channel impulse response from the UE, the channel impulse response based on the positioning reference signal.

In a thirtieth aspect, in combination with the twenty-ninth aspect, the techniques further include determining a multipath component based on the channel impulse response.

In a thirty-first aspect, in combination with the thirtieth aspect, the location information further indicates the multipath component.

In a thirty-second aspect, in combination with one or more of the seventeenth aspect through the thirty-first aspect, the techniques further include determining the position of the UE based on the coordinate point.

In a thirty-third aspect, in combination with the thirty-second aspect, wherein determining the position includes localizing the UE based on the coordinate point.

In a thirty-fourth aspect, in combination with one or more of the seventeenth aspect through the thirty-third aspect, the techniques further include adjusting an angle of a beam of the network entity based on the coordinate point.

In a thirty-fifth aspect, in combination with one or more of the seventeenth aspect through the thirty-fourth aspect, the network node includes a location management function.

In a thirty-sixth aspect, in combination with one or more of the seventeenth aspect through the thirty-fifth aspect, the network entity includes a base station, a roadside unit, or another UE.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving a positioning reference signal from a network entity;
   determining a channel impulse response based on the positioning reference signal;
   receiving a first image of an object from an image capture device;

transmitting positioning information that indicates the channel impulse response; and
receiving location information that includes a coordinate point, a position of the UE determined based on the coordinate point, or a combination thereof, the coordinate point generated based on:
 a relative orientation between the UE and the network entity; and
 a matched pair of points including a first point of the first image and a second point of a second image of the object captured by the network entity.

2. The method of claim 1, further comprising:
capturing a first image by the first image capture device of the UE, and
wherein the location information includes assistance information, and
wherein the coordinate point includes a virtual access three-dimensional (3D) point.

3. The method of claim 1, further comprising:
receiving configuration information associated with one or more visual features;
determining the first point based on the configuration information, the first point including a key point; and
transmitting position information that indicates the first point, a feature descriptor, or a combination thereof.

4. The method of claim 3, wherein the configuration information indicates a key point detection technique, a feature descriptor of one or more key points, a number of the one or more key points, a location or direction of the one or more key points, a parameter for an image capture device, or a combination thereof.

5. The method of claim 1, wherein the location information indicates the coordinate point and a multipath component based on a channel impulse response measured by the UE.

6. The method of claim 1, further comprising:
determining the position of the UE based on the location information; and
adjusting an angle of a receive beam to have an angle of departure associated with the coordinate point, the coordinate point associated with a reflection point.

7. The method of claim 1, wherein:
the network entity includes a base station, a roadside unit, or another UE; and
the location information is received from a location management function.

8. A user equipment (UE) comprising:
a memory storing processor-readable code; and
at least one processor coupled to the memory, the at least one processor configured to execute the processor-readable code to cause the at least one processor to:
receive a positioning reference signal from a network entity;
determine a channel impulse response based on the positioning reference signal;
receive a first image of an object from an image capture device;
transmit positioning information that indicates the channel impulse response; and
receive location information that includes a coordinate point associated with the object, a position of the UE determined based on the coordinate point, or a combination thereof, the coordinate point determined based on:
 a relative orientation between the UE and the network entity; and
 a matched pair of points including a first point of the first image and a second point of a second image of the object captured by the network entity.

9. The UE of claim 8, further comprising:
the image capture device; and
wherein the at least one processor is configured to execute the processor-readable code to cause the at least one processor to:
receive configuration information associated with one or more visual features;
determine the first point based on the configuration information, the first point including a key point; and
transmit position information that indicates the first point, a feature descriptor, or a combination thereof.

10. The UE of claim 9, wherein the configuration information indicates a key point detection technique, a feature descriptor of one or more key points, a number of the one or more key points, a location or direction of the one or more key points, a parameter for an image capture device, or a combination thereof.

11. The UE of claim 8, wherein:
the location information indicates the coordinate point and a multipath component based on a channel impulse response measured by the UE; and
the at least one processor is configured to execute the processor-readable code to cause the at least one processor to:
determine the position of the UE based on the location information; and
adjust an angle of a receive beam to have an angle of departure associated with the coordinate point, the coordinate point associated with a reflection point.

12. The UE of claim 8, wherein:
the network entity includes a base station, a roadside unit, or another UE; or
the location information is received from a location management function.

13. A method of wireless communication performed by a network entity, the method comprising:
transmitting a positioning reference signal to a user equipment (UE);
receiving a channel impulse response from the UE, the channel impulse response based on the positioning reference signal;
determining a multipath component based on the channel impulse response;
generating a coordinate point based on:
 a relative orientation between the UE and a network entity; and
 a matched pair of image points including a first point of a first image of an object captured by the UE and a second point of a second image of the object captured by the network entity; and
transmitting location information to the UE, the location information indicates the coordinate point, a position of the UE determined based on the coordinate point, the multipath component, or a combination thereof.

14. The method of claim 13, further comprising:
generating configuration information associated with one or more visual features; and
transmitting the configuration information to the UE, the network entity, or a combination thereof.

15. The method of claim 14, wherein the configuration information indicates a key point detection technique, a feature descriptor of one or more key points, a number of the one or more key points, a location or direction of the one or more key points, a parameter for an image capture device, or a combination thereof.

16. The method of claim 14, further comprising:
receiving positioning information from the UE, and
wherein the positioning information includes feature information, a channel impulse response, or a combination thereof, the feature information is based on the first image, the feature information generated based on the configuration information transmitted to the UE.

17. The method of claim 13, further comprising:
capturing the second image;
determining one or more matched pairs of image points based on the first image and the second image, the one or more matched pairs of image points including the matched pair of image points based on the first point and the second point;
determining, based on the one or more matched pair of image points, a relative pose; and
determining the coordinate point based on the relative pose and a translation between the network entity and the UE.

18. The method of claim 13, further comprising:
determining the position of the UE based on the coordinate point, and
wherein determining the position includes localizing the UE based on the coordinate point.

19. The method of claim 13, further comprising adjusting an angle of a beam of the network entity based on the coordinate point.

20. The method of claim 13, wherein the network entity includes a location management function.

21. The method of claim 13, wherein the network entity includes a base station, a roadside unit, the network entity, or another UE.

22. A network entity comprising:
a memory storing processor-readable code; and
at least one processor coupled to the memory, the at least one processor configured to execute the processor-readable code to cause the at least one processor to:
transmit a positioning reference signal;
receive a channel impulse response from a user equipment (UE), the channel impulse response based on the positioning reference signal;
determine a multipath component based on the channel impulse response;
generate a coordinate point based on:
a relative orientation between the UE and a network entity; and
a matched pair of image points including a first point of a first image of an object captured by the UE and a second point of a second image of the object captured by the network entity; and
transmit location information to the UE, the location information indicates the coordinate point, a position of the UE determined based on the coordinate point, the multipath component, or a combination thereof.

23. The network entity of claim 22, the at least one processor is configured to execute the processor-readable code to cause the at least one processor to:
generate configuration information associated with one or more visual features; and
transmit the configuration information to the UE, the network entity, or a combination thereof.

24. The network entity of claim 23, wherein the at least one processor is configured to execute the processor-readable code to cause the at least one processor to:
receive positioning information from the UE, and
wherein the positioning information includes feature information, a channel impulse response, or a combination thereof, the feature information is based on the first image, the feature information generated based on the configuration information transmitted to the UE.

25. The network entity of claim 22, further comprising:
an image capture device configured to capture the second image, and
wherein the at least one processor is configured to execute the processor-readable code to cause the at least one processor to:
determine one or more matched pairs of image points based on the first image and the second image, the one or more matched pairs of image points including the matched pair of image points based on the first point and the second point;
determine, based on the one or more matched pair of image points, a relative pose; and
determine the coordinate point based on the relative pose and a translation between the network entity and the UE.

26. The network entity of claim 22, wherein the at least one processor is configured to execute the processor-readable code to cause the at least one processor to:
determine the position of the UE based on the coordinate point, and
wherein determining the position includes localizing the UE based on the coordinate point.

* * * * *